(No Model.)
C. GRATTAN.
BRAKE FOR HARVESTERS.
No. 490,197. Patented Jan. 17, 1893.
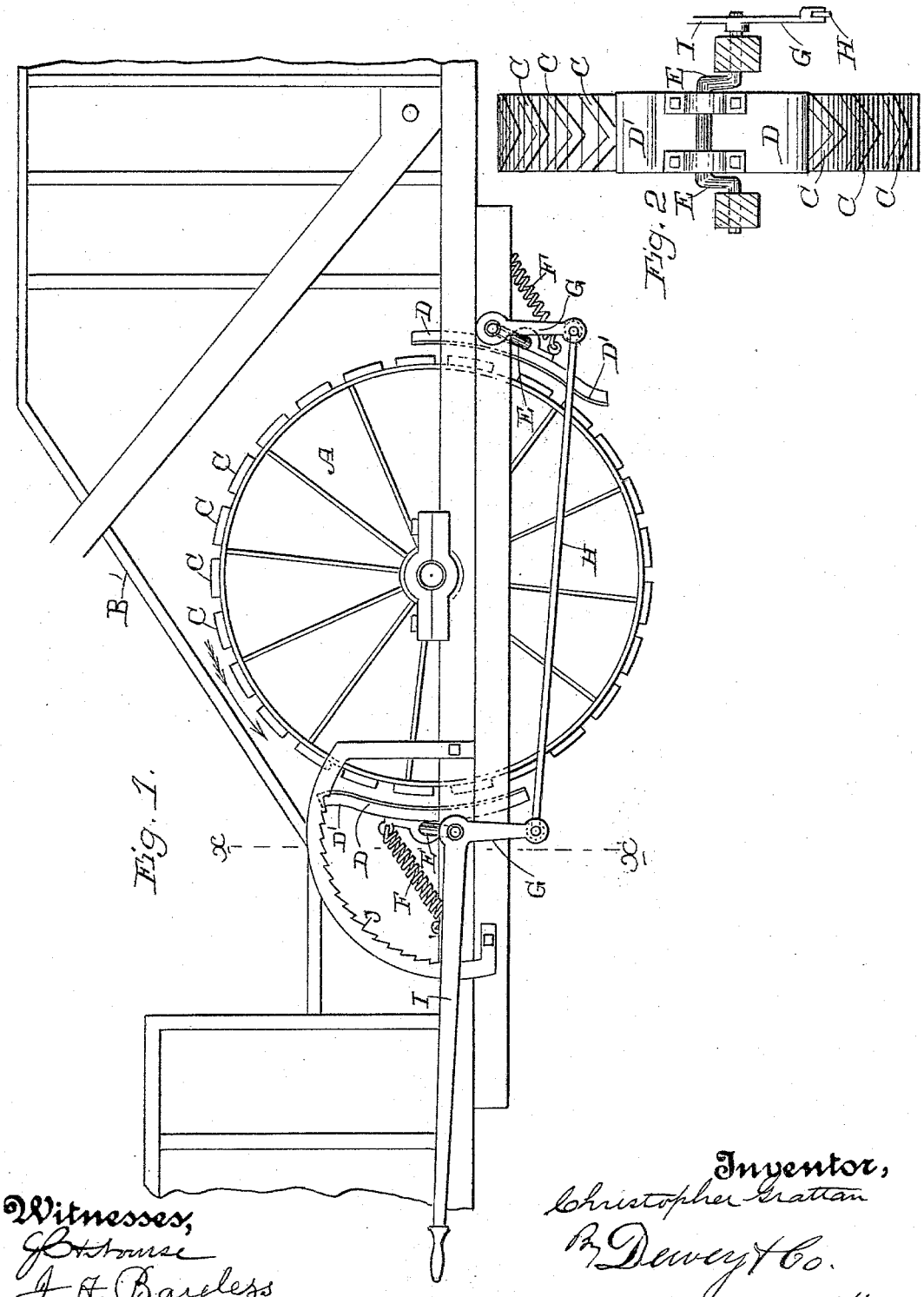
Witnesses:
J. B. Strouse
J. H. Bayless
Inventor,
Christopher Grattan
B. Dewey & Co.
Attys

UNITED STATES PATENT OFFICE.

CHRISTOPHER GRATTAN, OF STOCKTON, CALIFORNIA.

BRAKE FOR HARVESTERS.

SPECIFICATION forming part of Letters Patent No. 490,197, dated January 17, 1893.

Application filed October 1, 1892. Serial No. 447,517. (No model.)

*To all whom it may concern:*

Be it known that I, CHRISTOPHER GRATTAN, a citizen of the United States, residing at Stockton, San Joaquin county, State of California, have invented an Improvement in Brakes for Harvesters; and I hereby declare the following to be a full, clear, and exact description of the same.

My invention relates to a brake for that class of machinery known as traveling harvesters.

It consists in certain details of construction which will be more fully explained by reference to the accompanying drawings, in which—

Figure 1 is a side view of a portion of a thrashing machine showing my invention. Fig. 2 is a transverse section on the dotted line $x$—$x$ of one side of the frame and one of the driving wheels.

The object of my invention is to provide a powerful compressor brake, the parts of which are so mounted that the brake is applied to opposite sides of the main driving wheel of a traveling harvester, the shoes acting directly upon the projecting ribs which extend radially outward from the rim of the wheel for the purpose of giving the wheel a sufficient hold on the ground over which it travels to drive the machinery connected with it. These machines are hauled by from eighteen to twenty-four horses, and when the team becomes unmanageable, it is absolutely necessary to have some effective device for checking the speed of the machine, and through it controlling the team.

This brake must preferably be applied to the wheel which drives the machinery and which has the projecting ribs upon its face, and as there is no smooth surface of the rim for the proper application of a brake, it is a difficult matter to contrive such a brake as will be effective.

In my invention A is one of the main bearing wheels which serves as a driver for the machinery of a traveling harvester B, which is supported upon these wheels, which are so disposed beneath the machine as to carry the principal portion of the weight. The wheel A has diagonal or V-shaped ribs or flanges C bolted upon its face, extending from side to side and projecting outwardly from the face about two inches. These ribs C are technically called "grousers."

Upon opposite sides of the wheel are the brake-blocks D having a sufficient length, and a curvature corresponding with that of the periphery of the wheel. These brake-blocks are supported upon short cranks E, the shafts of which pass through journal-boxes or supports in the frame timbers of the machine. The interior faces of the brake-blocks are shod with sheet iron or sheet steel so as to present a surface which will not readily be worn out by the friction of the ribs C against which they are designed to act. The end of each brake-block which is presented so that the wheel in rotation travels toward it, is curved outwardly, as shown at D' so as to insure its not catching or presenting any abrupt obstruction to the movement of the wheel. From the rear portion of the brake-block of some portion of the frame extends a spring F, the tendency of which is to draw the brake-block away from the wheel.

Upon the crank shafts are fixed the crank arms or levers G which are connected together by a rod H so that they both move in unison. I is a lever connected with one of these arms and extending forward along the frame of the machine to a point within easy reach of one of the operators who constantly travel with the machine. In the present case I have shown it with the handle terminating within reach of the sack sewer who is thus enabled to instantly grasp the lever whenever occasion requires.

J is an arc having detent teeth upon it adapted to be engaged by a corresponding pawl or catch upon the lever so as to hold it at any point desired.

The crank shafts carrying the brake-blocks may be situated as shown in the present drawings, one above and the other below the frame timber, or both may be situated above the frame timbers to insure the rear one being sufficiently high above the surface of the ground not to make contact with it. When, by the movement of the hand lever, the crank arms carrying the brake-blocks are thrown toward the wheel, the ends of the brake-block opposite to those to which the springs are attached, are first forced against the rim of the wheel and the continued movement of the lever carries the remaining portion of the face of the brake-blocks into contact with the wheel and by reason of the connecting rod H between the actuating levers G, the two are drawn toward each other and mutually counteract the force which is brought upon them, thus forming a strong compression upon opposite sides of the wheel rim, while at the same time no extra friction or strain is brought upon the journal boxes of the wheel shaft, which is important where a powerful brake is being operated. The faces of these driving wheels are from sixteen to twenty inches or more in diameter, the ribs or grousers extending entirely across from one side to the other.

I prefer to make the brake shoe of a corresponding width so that the frictional pressure will be applied to the edges of the ribs over the entire width of the wheel face. This prevents the ribs being unequally worn or having channels cut in them by constant use.

Having thus described my invention, what I claim as new and desire to secure by Letters Patent is—

1. A brake for traveling harvesters consisting of brake-blocks suspended upon crank shafts or eccentrics upon opposite sides of the wheel, lever arms fixed to the crank shafts and connected together to move in unison, and a hand lever by which the crank shafts are turned so as to force the brakes simultaneously into contact with the wheel rim, substantially as herein described.

2. A brake for harvesters consisting of the curved brake-blocks having shoes fixed to their interior faces, crank shafts journaled upon the frame of the machine upon opposite sides of the wheel, levers connected with the crank shafts and a connecting rod by which these levers are united so that the shafts are turned in unison, and a hand lever whereby the shafts are turned to force the brake blocks into contact with the wheel face, and the returning springs whereby the brakes are drawn away and held at an even distance from the wheel when not in use, substantially as herein described.

3. In a harvester, the driving wheel having the rib projecting radially from its outer periphery, brake-blocks suspended from cranks journaled upon the frame of the machine at opposite sides of the wheels, said brake-blocks having the ends toward which the wheel approaches in its rotation, curved outwardly, wearing shoes fixed to the interior faces of the brake-blocks, a lever arm connected with one of the crank shafts whereby the crank is moved and the brake forced into contact with the wheel rim, short lever arms projecting from each of the crank shafts and the connecting rod uniting them so that both brakes are applied to opposite sides of the wheel simultaneously, and springs whereby the brakes are correspondingly removed from the face of the wheel when the hand lever is moved in the opposite direction, substantially as herein described.

In witness whereof I have hereunto set my hand.

CHRISTOPHER GRATTAN.

Witnesses:
S. H. NOURSE,
J. A. BAYLESS.